United States Patent
Zhan et al.

(10) Patent No.: US 10,813,171 B2
(45) Date of Patent: Oct. 20, 2020

(54) SETTING DEVICE AND HEATING APPARATUS HAVING THE SAME

(71) Applicant: TSANN KUEN (ZHANGZHOU) ENTERPRISE CO., LTD., Zhangzhou, Fujian (CN)

(72) Inventors: Yixin Zhan, Zhangzhou (CN); Haiping Zhang, Zhangzhou (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 906 days.

(21) Appl. No.: 15/146,059

(22) Filed: May 4, 2016

(65) Prior Publication Data

US 2016/0330796 A1    Nov. 10, 2016

(30) Foreign Application Priority Data

May 8, 2015   (CN) .......................... 2015 1 0230523

(51) Int. Cl.
*H05B 1/02* (2006.01)
*G05D 23/19* (2006.01)
*D06F 75/26* (2006.01)
*H01H 3/10* (2006.01)

(52) U.S. Cl.
CPC ............. *H05B 1/02* (2013.01); *D06F 75/265* (2013.01); *G05D 23/1902* (2013.01); *F24D 2220/0257* (2013.01); *H01H 3/10* (2013.01)

(58) Field of Classification Search
CPC .... H05B 1/02; D06F 75/265; G05D 23/1902; F24D 2220/0257; H01H 3/10
USPC ........................................................ 219/482
See application file for complete search history.

(56) References Cited

U.S. PATENT DOCUMENTS 3,411,710 A * 11/1968 Willson ................. H01H 89/04
236/15 A

\* cited by examiner

*Primary Examiner* — Chee-Chong Lee
(74) *Attorney, Agent, or Firm* — Nixon & Vanderhye P.C.

(57) ABSTRACT

A setting device for a control shaft of a thermostat includes a first coupling piece, a second coupling piece, and a knob member. The first coupling piece is sleeved on the control shaft to permit the control shaft to rotate therewith. The second coupling piece is loosely sleeved on the control shaft and has two studs engaged respectively in two slots of the first coupling piece to permit the first coupling piece to rotate therewith. The knob member has two tongues fitted in two gaps in the second coupling piece to permit the second coupling piece to be rotated with the knob member, whereby a force applied to rotate the knob member can be accurately transmitted to the control shaft for adjusting a setting temperature of the thermostat.

10 Claims, 9 Drawing Sheets

SETTING DEVICE AND HEATING APPARATUS HAVING THE SAME

CROSS-REFERENCE TO RELATED APPLICATION

This application claims priority from Chinese application no. 201510230523.X, filed on May 8, 2015.

FIELD

The disclosure relates to a setting device, more particularly to a setting device for a thermostat, and a heating apparatus including the setting device.

BACKGROUND

Figure 1:
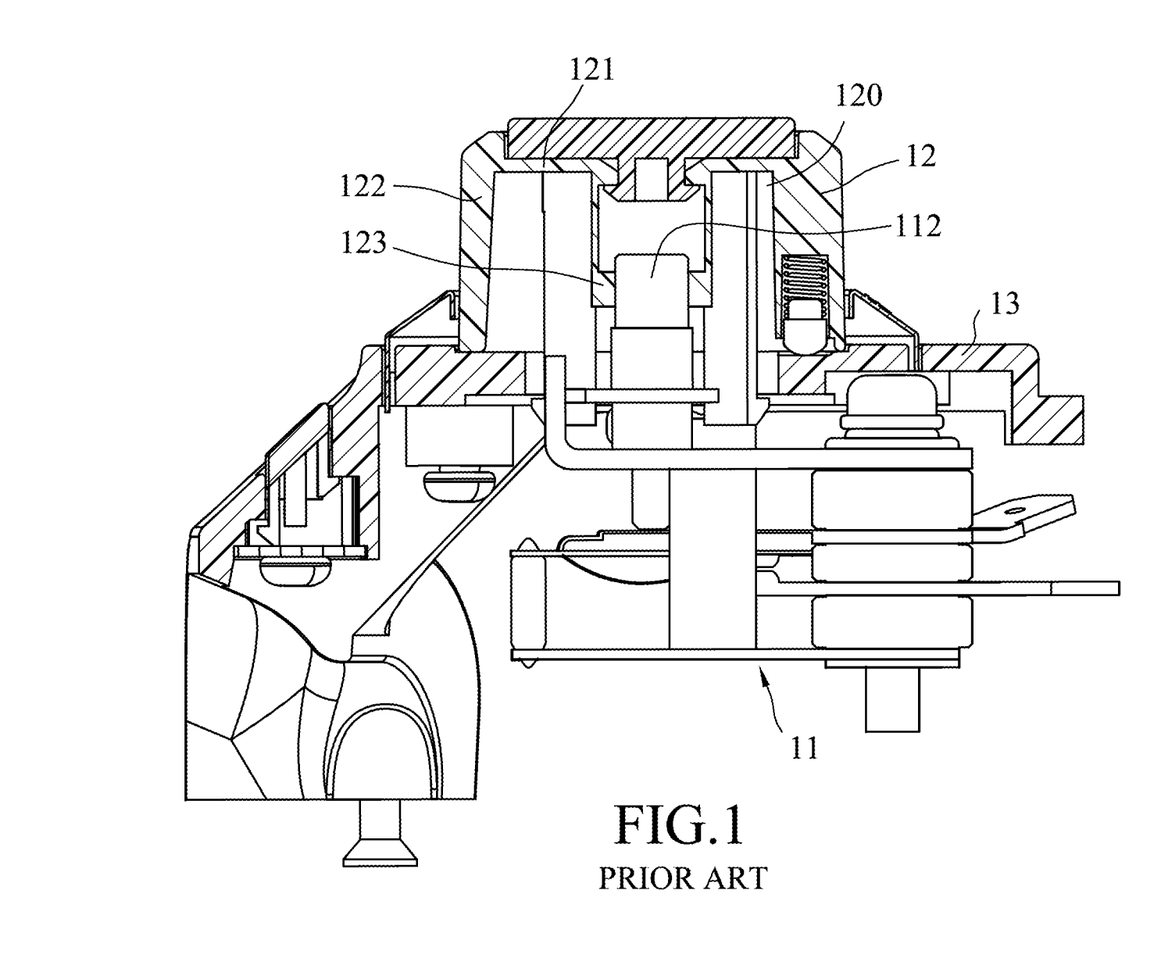
FIG. 1 is a fragmentary cross-sectional view of a conventional setting device.

With reference to FIG. 1, a conventional heating device includes a thermostat body 11, a control shaft 112, a knob 12, and a mounting seat 13. The control shaft 112 is rotatably mounted on the thermostat body 11 to adjust a setting temperature of the thermostat body 11. The knob 12 has a top wall 121 with a periphery, a surrounding wall 122 extending downwardly from the periphery of the top wall 121 to define an inner space 120, and a tubular wall 123 which extends downwardly from the top wall 121 and which is disposed in the inner space 120. The tubular wall 123 is configured to be sleeved on and engaged with an upper end of the control shaft 112 such that the knob 12 is rotatably mounted on the mounting seat 13. When a user rotates the knob 12 to set a temperature, the control shaft 112 is rotated therewith so as to adjust the setting temperature of the thermostat 11. When assembling the knob 12 to the control shaft 112, it is necessary to ensure that the tubular wall 123 is sleeved on the control shaft 112 so as to permit the control shaft 112 to be rotated with the knob 12. If the control shaft 112 is tilted or shifted slightly, the tubular wall 123 may not be correctly sleeved on the control shaft 112.

In addition, because the tubular wall 123 of the knob 12 is directly engaged with the control shaft 112, the tubular wall 123 or the control shaft 112 is likely to wear after a period of use so that the control shaft 112 may not be rotated correctly to adjust the setting temperature in response to rotation of the knob 12.

SUMMARY

Therefore, an object of the disclosure is to provide a novel setting device which can be easily assembled to a control shaft of a thermostat, and which is less likely to wear after a period of use.

According to a first aspect of the disclosure, a setting device for a control shaft of a thermostat includes a first coupling piece, a second coupling piece, and a knob member. The control shaft has an upper end with a non-circular cross-section and is rotatable about a shaft axis to adjust a setting temperature of the thermostat. The first coupling piece has two slots which are angularly displaced from each other in a circumferential direction about the shaft axis, and a first central bore which is configured to permit the first coupling piece to be fittingly sleeved on the upper end of the control shaft such that the control shaft is permitted to be rotated with the first coupling piece. The second coupling piece has a second central bore, two studs, and a pair of first gaps. The second central bore has a dimension larger than the upper end of the control shaft to permit the second coupling piece to be sleeved on the upper end of the control shaft. The studs are configured to engage respectively in the slots so as to permit the first coupling piece to be rotated with the second coupling piece. The first gaps are angularly displaced from each other in the circumferential direction. The knob member includes a top wall, and a pair of first tongues each of which extends downwardly from the top wall to be fitted into a respective one of the first gaps so as to permit the second coupling piece to be rotated with the knob member.

According to a second aspect of the disclosure, a heating apparatus includes a thermostat, a mounting seat, a first coupling piece, a second coupling piece, and a knob member. The thermostat has a control shaft which has an upper end and which is rotatable about a shaft axis to adjust a setting temperature of the thermostat. The mounting seat has a top surface, a bottom surface, and a through hole which extends through the top and bottom surfaces, and which is configured to permit the control shaft to extend therethrough. The first coupling piece has two slots which are angularly displaced from each other in a circumferential direction about the shaft axis, and a first central bore which is configured to permit the first coupling piece to be fittingly sleeved on the upper end of the control shaft such that the control shaft is permitted to be rotated with the first coupling piece. The second coupling piece has a second central bore, two studs, and a pair of first gaps. The second central bore has a dimension larger than the upper end of the control shaft to permit the second coupling piece to be sleeved on the upper end of the control shaft. The two studs are configured to engage respectively in the slots so as to permit the first coupling piece to be rotated with the second coupling piece. The first gaps are angularly displaced from each other in the circumferential direction. The knob member is configured to be rotatably mounted on the mounting seat and includes a top wall, and a pair of first tongues each of which extends downwardly from the top wall to be fitted into a respective one of the first gaps so as to permit the second coupling piece to be rotated with the knob member.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 2:
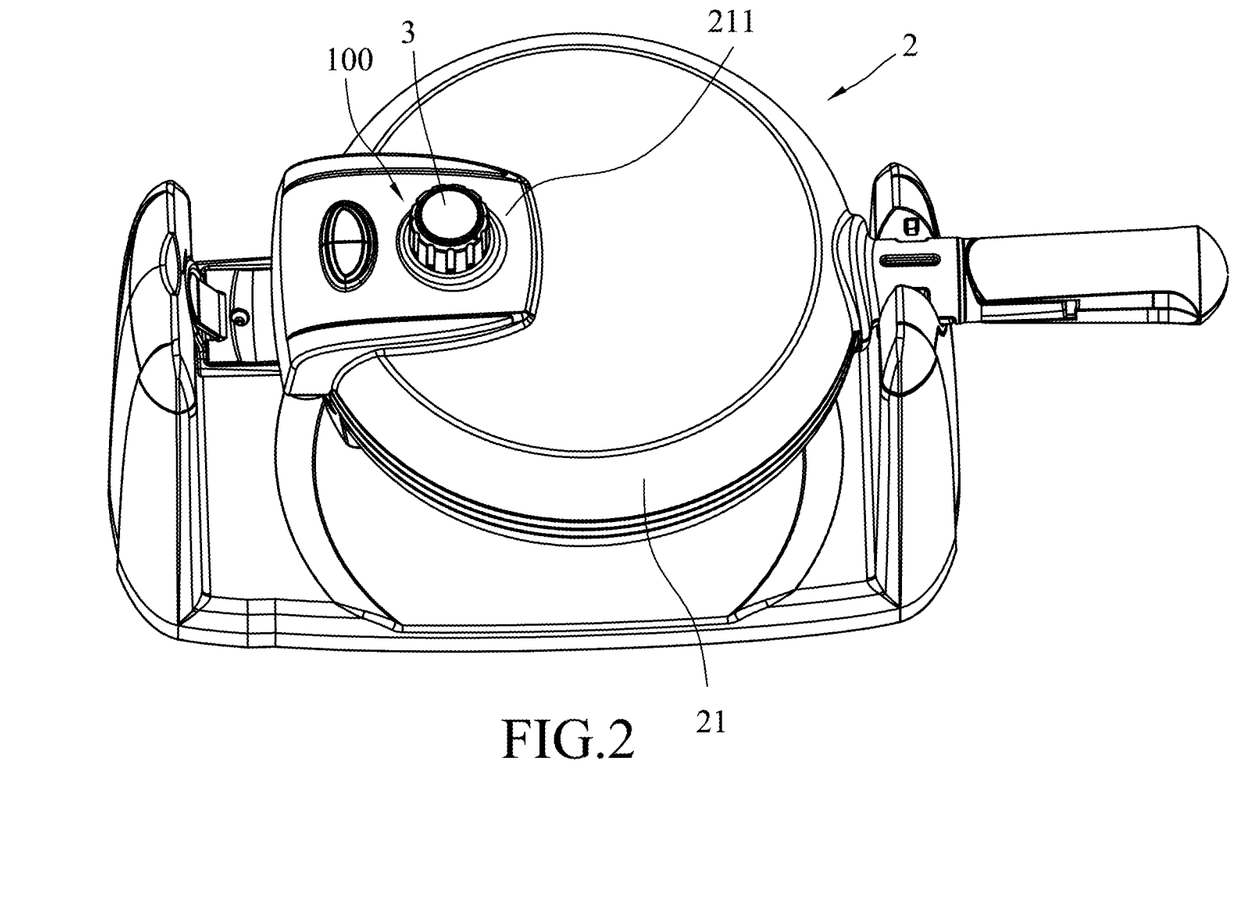
FIG. 2 is a schematic view of a first embodiment of the disclosure.

According to a first embodiment of the disclosure, a heating apparatus exemplified by FIG. 2 is an electric grill 2 which has a grill housing 21, a heating unit (not shown)

disposed inside the grill housing 21 for heating food, a thermostat 22 (see FIG. 3), and a setting device 100.

Figure 3:
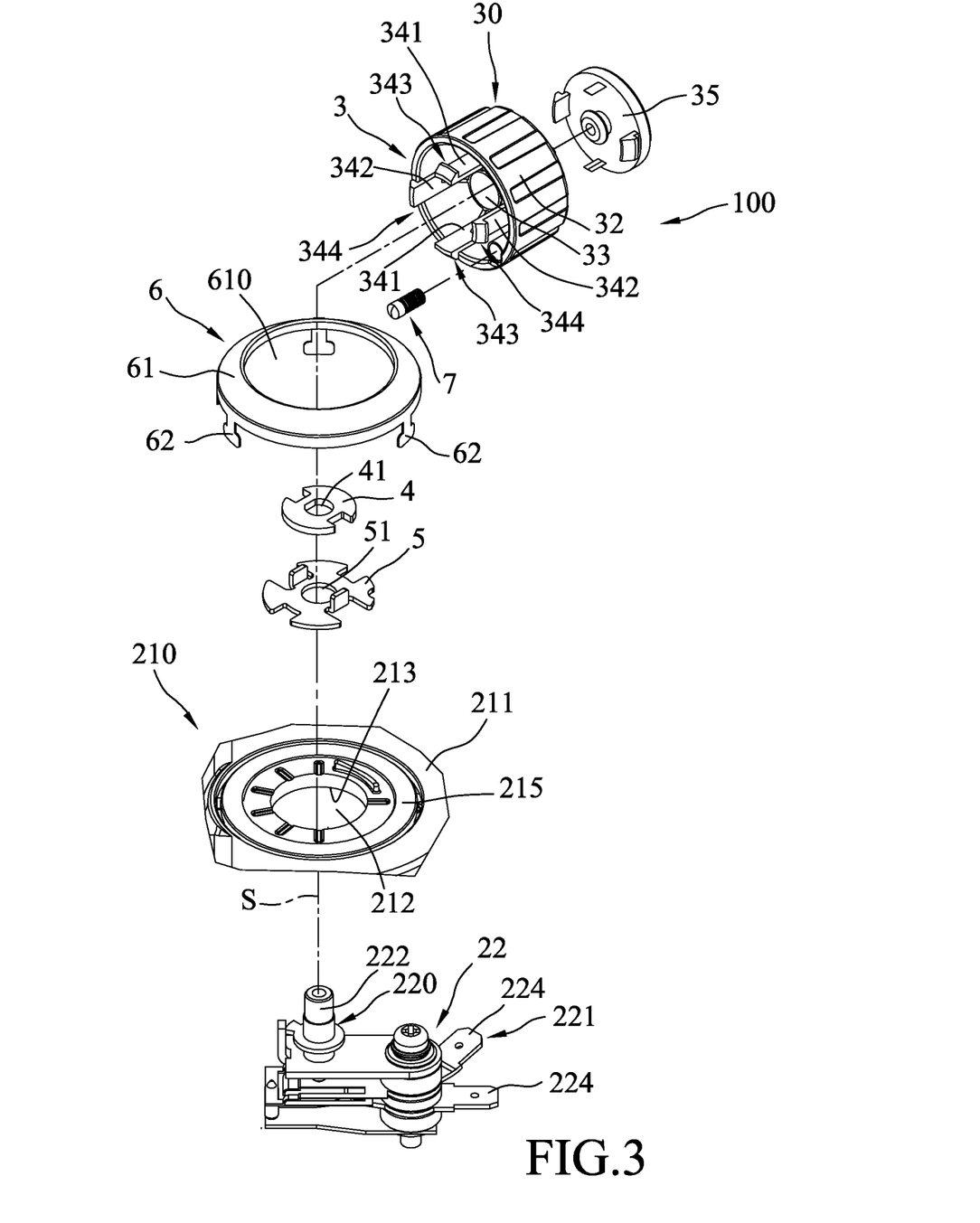
FIG. 3 is an exploded perspective view of a setting device of the first embodiment.
Figure 4:
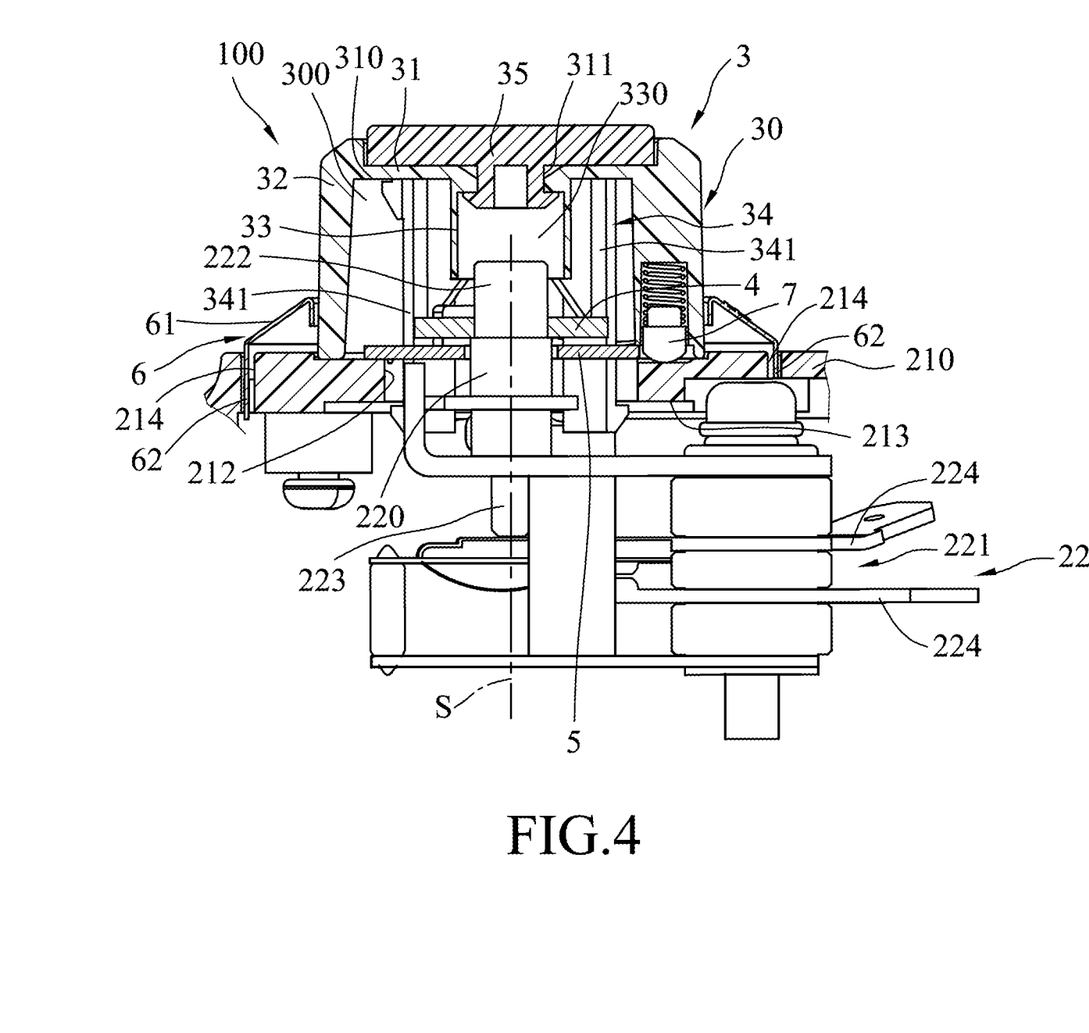
FIG. 4 is a fragmentary longitudinal cross-sectional view of the setting device of the first embodiment.

As shown in FIGS. 3 and 4, the thermostat 22 includes a main body 221 and a control shaft 220. The main body 221 may be of any conventional configuration and is electrically connected to the heating unit for controlling operation of the heating unit. The control shaft 220 is mounted on the main body 221 and is rotatable about a shaft axis (S). In this embodiment, the main body 221 has metal strips 224, and the control shaft 220 has an upper end 222 with a non-circular cross-section, and a lower end 223 in abutting engagement with the metal strips 224. The metal strips 224 deform to vary an electrical conductivity therebetween in response to rotation of the control shaft 220, thereby adjusting a setting temperature of the thermostat 22. In operation, when a cooking temperature of the electric grill is higher than the setting temperature, the heating unit is switched off, and when a cooking temperature is lower than the setting temperature, the heating unit is switched on.

The setting device 100 includes a mounting seat 210, a first coupling piece 4, a second coupling piece 5, and a knob member 3.

The mounting seat 210 is disposed on the grill housing 21 and has a top surface 211, a bottom surface 213, and a through hole 212 which extends through the top and bottom surfaces 211, 213, and which is configured to permit the control shaft 220 to extend therethrough.

Figure 5:
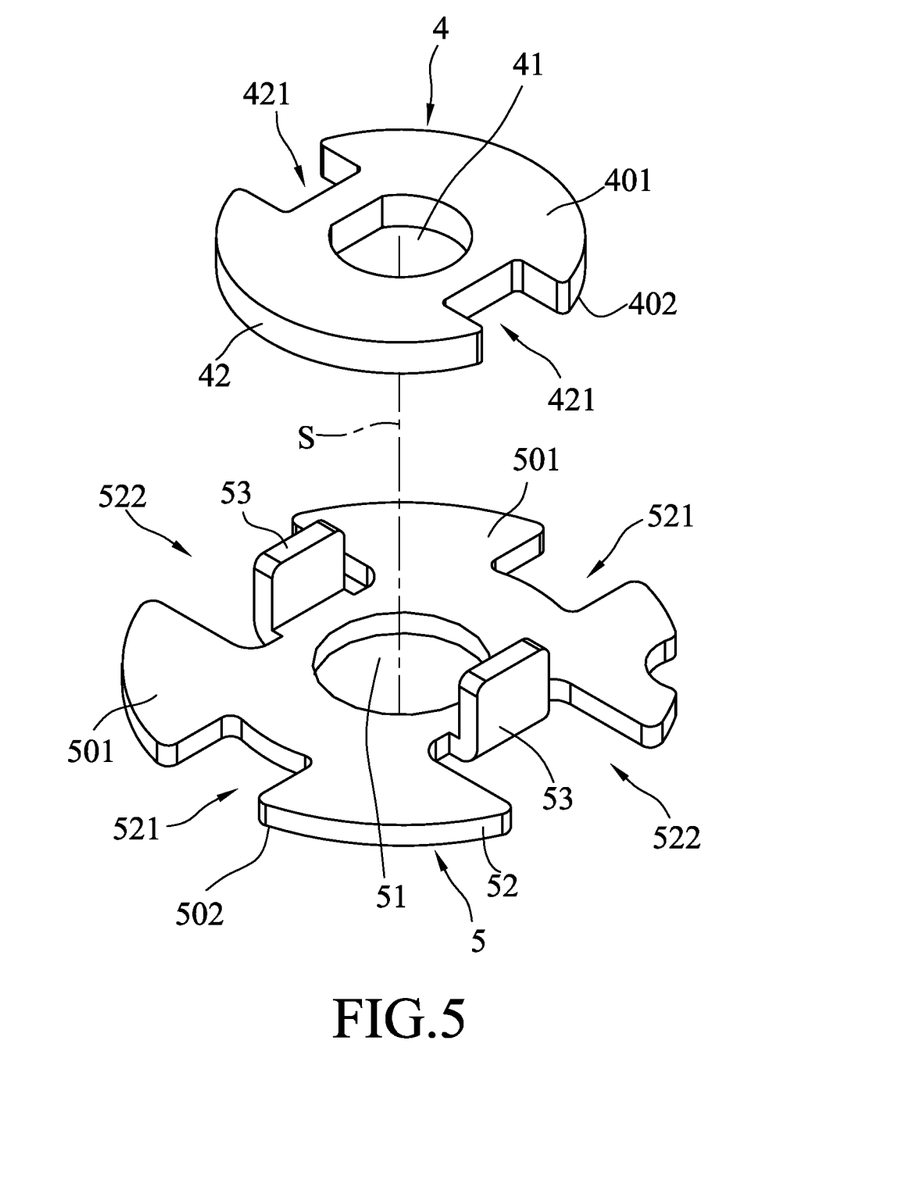
FIG. 5 is a schematic enlarged view of first and second coupling pieces.

With reference to FIGS. 3 to 5, the first coupling piece 4 has two slots 421 and a first central bore 41. The slots 421 are angularly displaced from each other in a circumferential direction about the shaft axis (S). The first central bore 41 extends along the shaft axis (S) and is configured to permit the first coupling piece 4 to be fittingly sleeved on the upper end 222 of the control shaft 220 such that the control shaft 220 is permitted to be rotated with the first coupling piece 4 and such that the first coupling piece 4 is prevented from rotation with respect to the control shaft 220. In an embodiment shown in FIGS. 3 and 5, the two slots 421 are diametrically opposite each other relative to the shaft axis (S).

The second coupling piece 5 has a second central bore 51, two studs 53, and a pair of first gaps 521. The second central bore 51 extends along the shaft axis (S) and has a dimension larger than a dimension of the upper end 222 of the control shaft 220 so as to permit the second coupling piece 5 to be loosely sleeved on the upper end 222 of the control shaft 220. The studs 53 are configured to engage respectively in the slots 421 so as to permit the first coupling piece 4 to be rotated with the second coupling piece 5. The first gaps 521 are angularly displaced from each other in the circumferential direction.

In an embodiment shown in FIGS. 4 and 5, the two studs 53 are disposed diametrically opposite to each other relative to the shaft axis (S). The studs 53 extend along a direction of the shaft axis (S) and are configured to engage respectively the slots 421. The first gaps 521 are diametrically opposite to each other.

In this embodiment, each of the studs 53 has a width substantially the same as that of the corresponding one of the slots 421.

The knob member 3 is configured to be rotatably mounted on the mounting seat 210. In this embodiment, the knob member 3 includes a knob housing 30 and a pair of first tongues 341. The knob housing 30 has a top wall 31 with a periphery 310, a surrounding wall 32, and a tubular wall 33. The surrounding wall 32 extends downwardly from the periphery 310 to surround the shaft axis (S) and to define therein an inner space 300 for accommodating the upper end 222 of the control shaft 220, the first coupling piece 4, and the second coupling piece 5. The tubular wall 33 is disposed in the inner space 300 and extends downwardly from the top wall 31 to surround the upper end 222 of the control shaft 220 and to define an accessing space 330.

In this embodiment, the second connecting member 82 includes two slots 421 which are formed in the first coupling piece 4, and which are diametrically opposite each other relative to the shaft axis S. Each of the slots 421 is bordered by corresponding ones of the first engaging areas 821. The first connecting member 81 includes two studs 53 which are formed on the second coupling piece 5, and which are disposed diametrically opposite to each other relative to the shaft axis (S). The studs 53 extend along a direction of the shaft axis (S) and are configured to engage respectively the slots 421.

In this embodiment, each of the studs 53 has a width substantially the same as that of the corresponding one of the slots 421.

The second engagement mechanism 9 is configured to permit the second coupling piece 5 to be rotated with the knob member 3. The second engagement mechanism 9 includes a third connecting member 91 and a fourth connecting member 92. The third connecting member 91 is disposed on one of the second coupling piece 5 and the knob member 3. The fourth connecting member 92 is disposed on the other one of the second coupling piece 5 and the knob member 3, and has a plurality of second engaging areas 921. The fourth connecting member 92 is configured to permit the third connecting member 91 to engage any one of the second engaging areas 921 and is angularly displaced from the second connecting member 82.

Each of the first tongues 341 extends downwardly from the top wall 31 to form a first engaging region 343, and each of which is configured to be fitted into a respective one of the first gaps 521, so as to permit the second coupling piece 5 to be rotated with the knob member 3, whereby a predetermined force applied to rotate the knob member 3 can be accurately transmitted to the control shaft 220 for adjusting a setting temperature of the thermostat 22.

In this embodiment, the first tongues 341 are angularly displaced from the studs 53 of the second coupling piece 5.

As best shown in FIG. 5, the first coupling piece 4 has a first upper surface 401, a first lower surface 402, and a first outer periphery 42. The first central bore 41 extends through the first upper and lower surfaces 401, 402. Each of the slots 421 extends radially and inwardly from the first outer periphery 42 toward the shaft axis (S) to facilitate fitting of the studs 53 into the slots 421.

Figure 6:
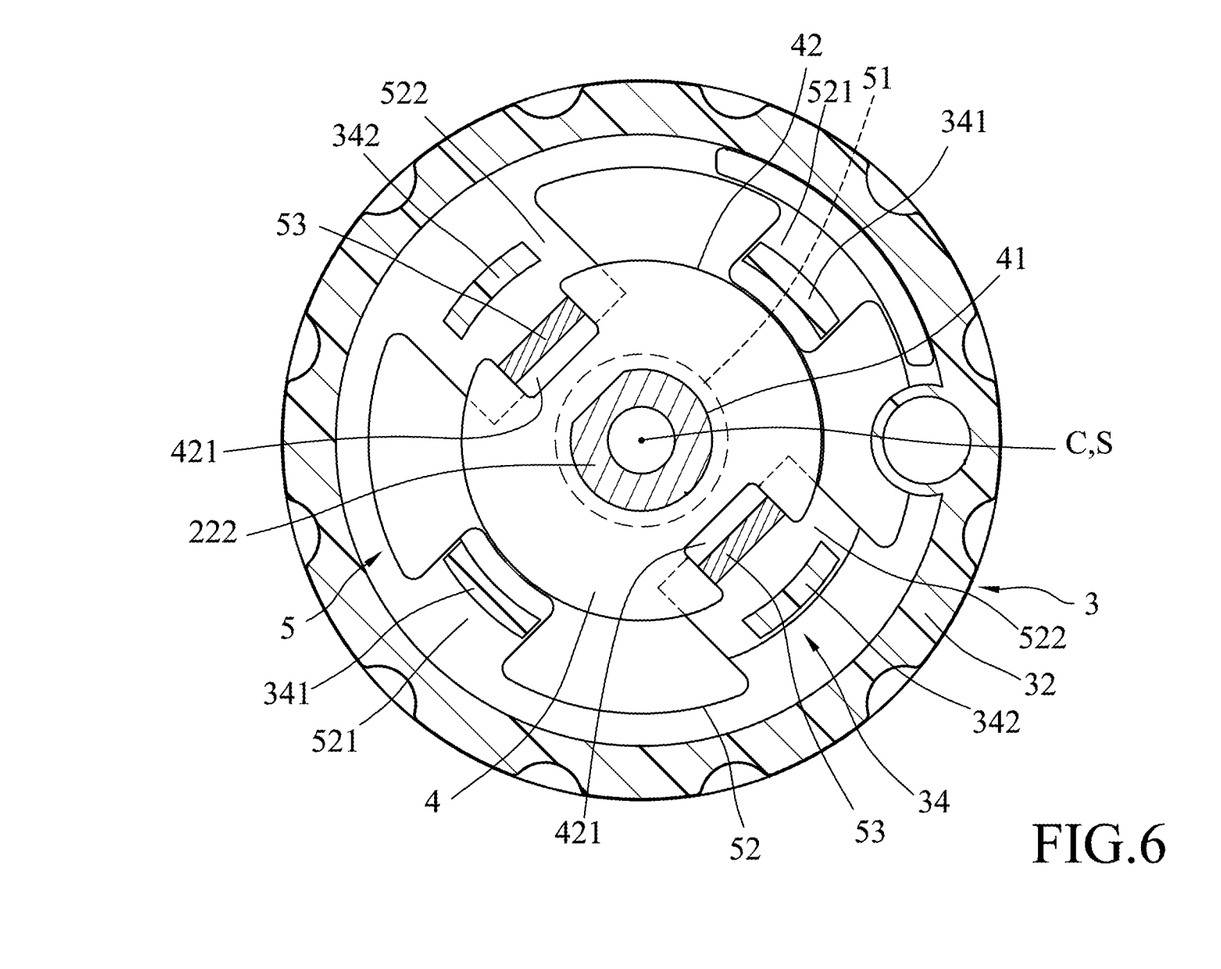
FIGS. 6 and 7 are transverse cross-sectional views of the setting device of the first embodiment.
Figure 7:
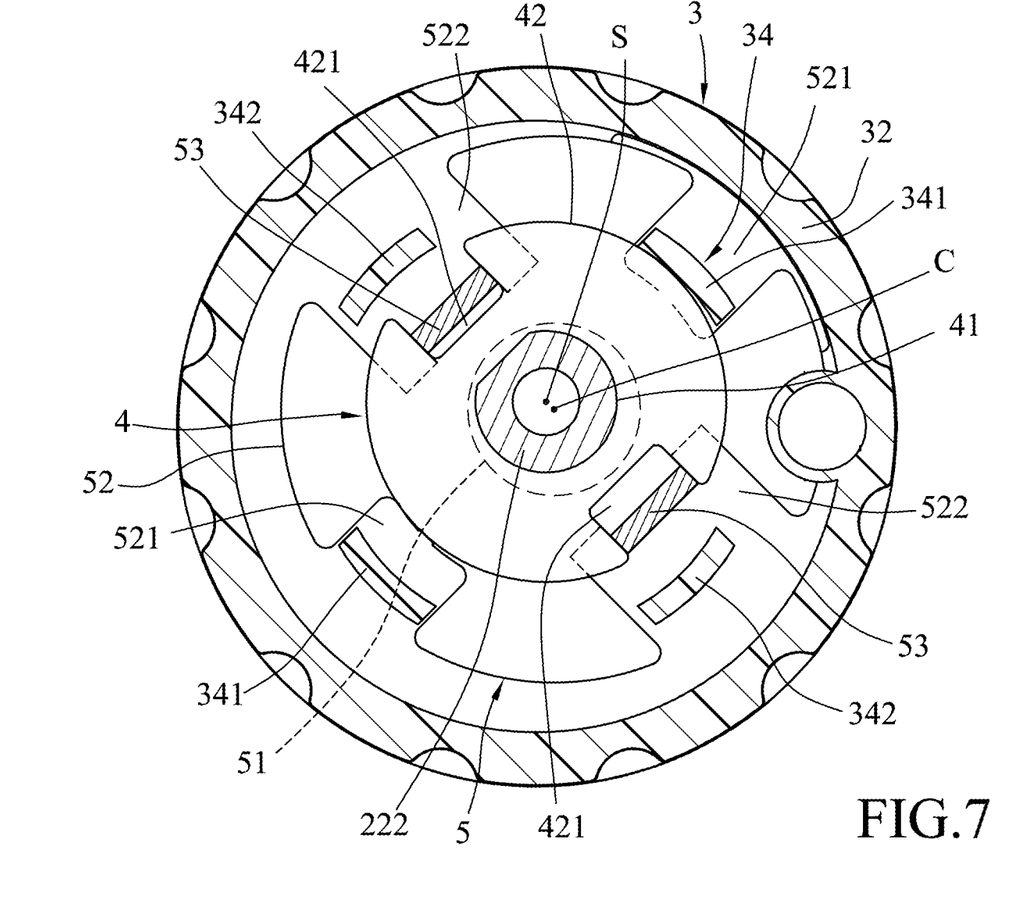

As shown in FIG. 6, in an ideal condition, the shaft axis (S) of the control shaft 220 is in alignment with a central axis (C) defined by the second central bore 51 of the second coupling piece 5. Because each of the slots 421 extends radially and inwardly from the first outer periphery 42 and has a radial length which is much larger than a thickness of each of the studs 53, when the shaft axis (S) of the control shaft 220 mounted on the main body 221 is tilted or shifted slightly from the central axis (C), resulting in a tilt or shift of the first coupling piece 4 (see FIG. 7), the studs 53 can still be fitted into the slots 421, respectively.

In this embodiment, the second coupling piece 5 has a second upper surface 501, a second lower surface 502, and a second outer periphery 52. The second central bore 51 extends through the second upper and lower surfaces 502. Each of the first gaps 521 extends radially and inwardly from the second outer periphery 52 toward the shaft axis (S) to facilitate fitting of the first tongues 341 into the first gaps 521, respectively. When assembling the knob housing 30 to the control shaft 220 through the first and second coupling pieces 4, 5, it is only necessary to ensure that (i) the first and second coupling pieces 4, 5 are sleeved on the upper end 222 of the control shaft 220, (ii) the studs 53 respectively engage the slots 421, and (iii) the first tongues 341 extend respectively through the first gaps 521. Therefore, exact alignment among the knob housing 30 and the first and second coupling pieces 4, 5 is unnecessary, and the assembly of the setting device 100 to the control shaft 220 of the thermostat 22 can be much easier.

In this embodiment, the second coupling piece 5 further includes a pair of second gaps 522 diametrically opposite to each other. The first gaps 521 and the second gaps 522 are equidistantly and angularly displaced from each other in a circumferential direction about the shaft axis (S). In this embodiment, each of the studs 53 is formed by slitting or cutting the second coupling piece 5 radially to form a strip and then bending the strip upwardly, thereby leaving a corresponding one of the second gaps 522 which extends radially and outwardly of the bent strip (i.e., the stud 53).

In addition, the knob member 3 further includes a pair of second tongues 342 each of which extends downwardly from the top wall 31 to form a second engaging region 344 (see FIG. 3), and each of which is configured to extend through the corresponding one of the second gaps 522 in the second coupling piece 5.

With reference to FIG. 3, the first engaging regions 343 of the first tongues 341 are configured to acquire a first biasing action which biases the first engaging regions 343 away from each other, and the second engaging regions 344 of the second tongues 342 are configured to acquire a second biasing action which biases the second engaging regions 344 away from each other so as to permit the first engaging regions 343 and the second engaging regions 344 to be squeezed against the first and second biasing actions into the through hole 212 of the mounting seat 210 such that the knob member 3 is frictionally and rotatably mounted onto the mounting seat 210.

Furthermore, each of the first engaging regions 343 and the second engaging regions 344 is in the form of a hook, and is configured to be in frictional engagement with the bottom surface 213 of the mounting seat 210.

In this embodiment, the mounting seat 210 has a plurality of slits 214 (see FIG. 4) displaced from each other in the circumferential direction, and the setting device 100 further includes an annular shell 6 having an annular body 61 and a plurality of tabs 62 (see FIGS. 3 and 4). Each of the tabs 62 is configured to be engageable in a corresponding one of the slits 214. The annular body 61 defines an annular opening 610 which is configured to permit the knob housing 30 to be fitted therein once the tabs 62 are engaged respectively in the slits 214.

In this embodiment, the top surface 211 of the mounting seat 210 has a guideway 215 surrounding the through hole 212. The setting device 100 further includes a spring-loaded pin 7 which is disposed in the surrounding wall 32 of the knob housing 30 and which is biased to be in frictional engagement with the guideway 215 so as to stabilize movement of the knob member 3 relative to the mounting seat 210.

As shown in FIG. 4, the top wall 31 has an access opening 311 in spatial communication with the accessing space 330. The upper end 222 of the control shaft 220 may be provided with a screwdriver slot (not shown) to receive a tip of a tool, e.g., a screwdriver, to permit turning of the control shaft 220 relative to the main body 221 so that the rotated position of the control shaft 220 with respect to the main body 221 can be manually adjusted. The knob member 3 further includes a cap 35 configured to cover the access opening 311.

Figure 8:
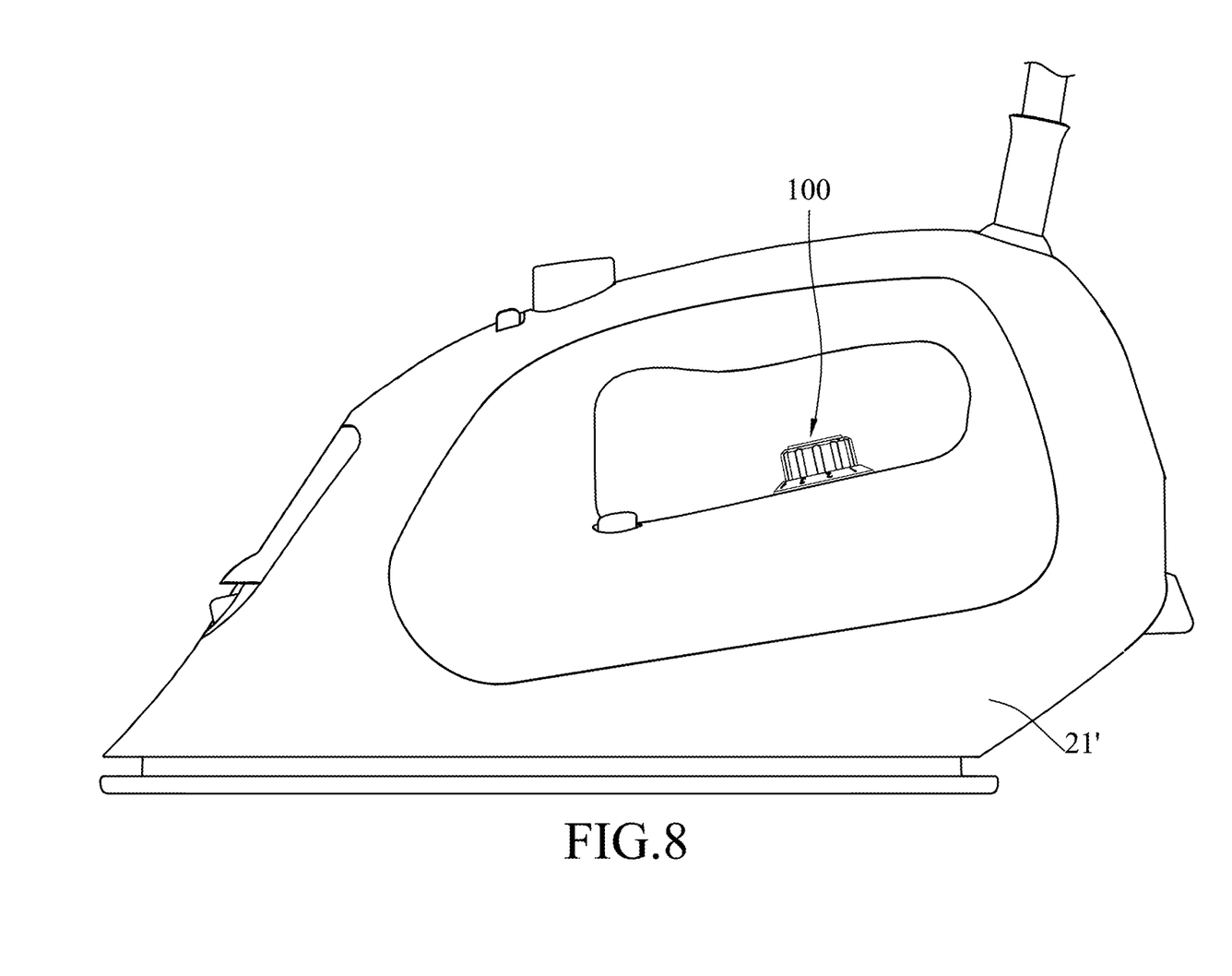
FIG. 8 is a schematic view of a second embodiment of the disclosure.

FIG. 8 illustrates a setting device 100 of the second embodiment of this disclosure mounted on a heating apparatus exemplified by a clothes iron for adjusting an operating temperature of the clothes iron. The clothes iron includes an iron housing 21' and a thermostat 22 (see FIG. 3) disposed inside the iron housing 21'. The setting device 100 in the second embodiment is similar to the setting device 100 disclosed in the first embodiment, except that the mounting seat 210 (see FIG. 3) is disposed on the iron housing 21'.

Figure 9:
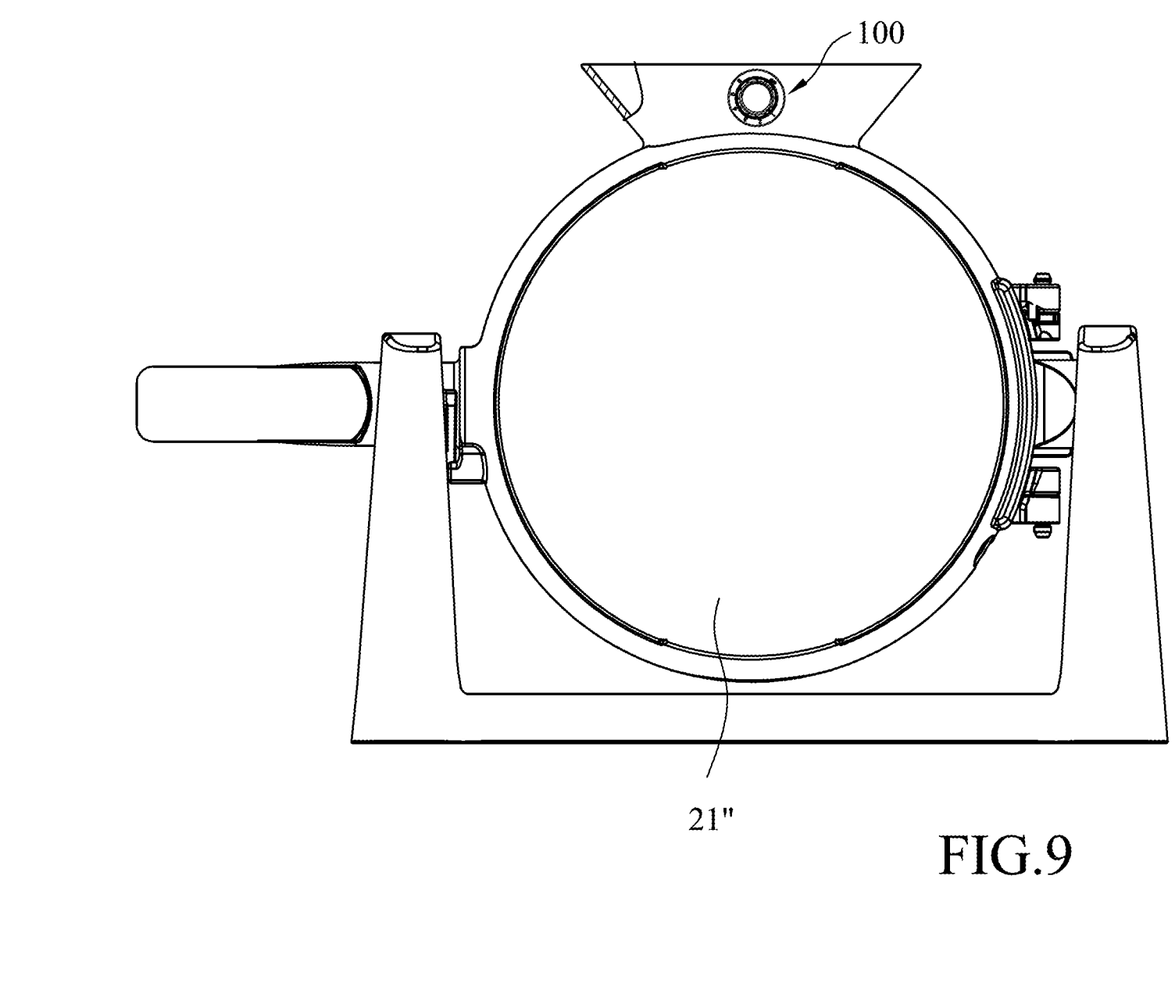
FIG. 9 is a schematic view of a third embodiment of the disclosure.

FIG. 9 illustrates a setting device 100 of the third embodiment of this disclosure mounted on a heating apparatus exemplified by a waffle machine for adjusting an operating temperature of the waffle machine. The waffle machine includes a machine housing 21" and a thermostat 22 (see FIG. 3) disposed inside the machine housing 21". The setting device 100 in the third embodiment is similar to that disclosed in the first embodiment, except that the mounting seat 210 (see FIG. 3) is disposed on the machine housing 21".

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A setting device for a control shaft of a thermostat, the control shaft having an upper end and being rotatable about a shaft axis to adjust a setting temperature of the thermostat, said setting device comprising:

a first coupling piece having
two slots which are angularly displaced from each other in a circumferential direction about the shaft axis, and
a first central bore which is configured to permit said first coupling piece to be fittingly sleeved on the upper end of the control shaft such that the control shaft is permitted to be rotated with said first coupling piece;

a second coupling piece having
a second central bore having a dimension larger than the upper end of the control shaft to permit said second coupling piece to be sleeved on the upper end of the control shaft,
two studs configured to engage respectively in said slots so as to permit said first coupling piece to be rotated with said second coupling piece, and a pair of first gaps angularly displaced from each other in the circumferential direction;

a knob member including a top wall, and a pair of first tongues each of which extends downwardly from said top wall to be fitted into a respective one of said first gaps so as to permit said second coupling piece to be rotated with said knob member, thereby allowing rotational force of said knob member to be transmitted to the control shaft through said first and second coupling pieces; and a mounting seat having a top surface, a bottom surface, and a through hole which extends through said top and bottom surfaces, and which is configured to permit the control shaft to extend therethrough, wherein said first gaps are diametrically opposite to each other;

each of said first tongues extends downwardly from said top wall to form a first engaging region;

said first tongues are angularly displaced from said studs of said second coupling piece;

said second coupling piece further has a pair of second gaps diametrically opposite to each other, said first gaps and said second gaps being angularly displaced from each other in a circumferential direction about the shaft axis, said knob member further including a pair of second tongues each of which extends downwardly from said top wall to form a second engaging region, and each of which is configured to extend through a corresponding one of said second gaps; and said first engaging regions of said first tongues are configured to acquire a first biasing action which biases said first engaging regions away from each other, and said second engaging regions of said second tongues are configured to acquire a second biasing action which biases said second engaging regions away from each other so as to permit said first engaging regions and said second engaging regions to be squeezed against the first and second biasing actions into said through hole of said mounting seat such that said knob member is frictionally and rotatably mounted onto said mounting seat.

2. The setting device according to claim 1, wherein:
said knob member is rotatably mounted on said mounting seat, and includes a knob housing having said top wall with a periphery, and a surrounding wall extending downwardly from said periphery of said top wall to surround the shaft axis and to define therein an inner space for accommodating the upper end of the control shaft, said first coupling piece, and said second coupling piece;

said two slots are diametrically opposite each other relative to the shaft axis; and said two studs are disposed diametrically opposite to each other relative to the shaft axis, and extend respectively along a direction of the shaft axis.

3. The setting device according to claim 2, wherein said first coupling piece has a first upper surface, a first lower surface, and a first outer periphery, said first central bore extending through said first upper and lower surfaces, each of said slots extending radially and inwardly from said first outer periphery toward the shaft axis to facilitate fitting of said studs into said slots, respectively.

4. The setting device according to claim 2, wherein said second coupling piece has a second upper surface, a second lower surface, and a second outer periphery, said second central bore extending through said second upper and lower surfaces, each of said first gaps extending radially and inwardly from said second outer periphery toward the shaft axis to facilitate fitting of said first tongues into said first gaps, respectively.

5. The setting device according to claim 2, wherein said mounting seat has a plurality of slits displaced from each other in a circumferential direction, said setting device further comprising an annular shell having an annular body and a plurality of tabs, each of said tabs being configured to be engageable in a corresponding one of said slits, said annular body defining an annular opening which is configured to permit said knob housing to be fitted therein once said tabs are engaged respectively in said slits.

6. The setting device according to claim 2, wherein said top surface of said mounting seat has a guideway surrounding said through hole, said setting device further including a spring-loaded pin which is disposed in said surrounding wall of said knob housing and which is biased to be in frictional engagement with said guideway so as to stabilize movement of said knob member relative to said mounting seat.

7. The setting device according to claim 2, wherein said top wall has an access opening, and said knob member further includes a cap configured to cover said access opening.

8. The setting device according to claim 1, wherein each of said second gaps is disposed radially and outwardly of a respective one of said studs.

9. The setting device according to claim 1, wherein each of said first engaging regions and said second engaging regions is in the form of a hook, and is configured to be in frictional engagement with said bottom surface of said mounting seat.

10. A heating apparatus comprising:
a thermostat having a control shaft which has an upper end and which is rotatable about a shaft axis to adjust a setting temperature of said thermostat;

a mounting seat having a top surface, a bottom surface, and a through hole which extends through said top and bottom surfaces, and which is configured to permit said control shaft to extend therethrough;

a first coupling piece having
two slots which are angularly displaced from each other in a circumferential direction about the shaft axis, and
a first central bore configured to permit said first coupling piece to be fittingly sleeved on said upper end of said control shaft such that said control shaft is permitted to be rotated with said first coupling piece;

a second coupling piece having
a second central bore having a dimension larger than said upper end of said control shaft to permit said second coupling piece to be sleeved on said upper end of said control shaft,
two studs configured to engage respectively in said slots so as to permit said first coupling piece to be rotated with said second coupling piece, and
a pair of first gaps angularly displaced from each other in the circumferential direction; and a knob member configured to be rotatably mounted on said mounting seat, and including a top wall, and a pair of first tongues each of which extends downwardly from said top wall to be fitted into a respective one of said first gaps so as to permit said second coupling piece to be rotated with said knob member, thereby allowing rotational force of said knob member to be transmitted to the control shaft through said first and second coupling pieces, wherein said first gaps are diametrically opposite to each other;

each of said first tongues extends downwardly from said top wall to form a first engaging region;

said first tongues are angularly displaced from said studs of said second coupling piece;

said second coupling piece further has a pair of second gaps diametrically opposite to each other, said first gaps and said second gaps being angularly displaced from each other in a circumferential direction about the shaft axis, said knob member further including a pair of second tongues each of which extends downwardly from said top wall to form a second engaging region, and each of which is configured to extend through a corresponding one of said second gaps; and said first engaging regions of said first tongues are configured to acquire a first biasing action which biases said first engaging regions away from each other, and said second engaging regions of said second tongues are configured to acquire a second biasing action which biases said second engaging regions away from each other so as to permit said first engaging regions and said second engaging regions to be squeezed against the first and second biasing actions into said through hole of said mounting seat such that said knob member is frictionally and rotatably mounted onto said mounting seat.

\* \* \* \* \*